United States Patent
Maver et al.

(10) Patent No.: US 6,238,470 B1
(45) Date of Patent: May 29, 2001

(54) AQUEOUS COATING COMPOSITION WITH IMPROVED BLOCK RESISTANCE CONTAINING ALKYL POLYGLYCOSIDE SURFACTANT MIXTURES

(75) Inventors: Tammy Lynne Maver, Moorestown, NJ (US); Robert Krasnansky, LeRouret (FR)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/193,904

(22) Filed: Nov. 18, 1998

(51) Int. Cl.$^7$ ............................ C09D 5/02; C09D 103/00
(52) U.S. Cl. .................. 106/162.1; 106/316; 524/47; 524/52; 524/56; 524/58
(58) Field of Search .............................. 524/800, 47, 52, 524/58, 56; 106/162.1, 316

(56) References Cited

U.S. PATENT DOCUMENTS

| | | | |
|---|---|---|---|
| 4,657,999 | * | 4/1987 | Hoefer et al. ........................ 526/200 |
| 5,340,394 | | 8/1994 | Elsamanoudi . |
| 5,501,813 | * | 3/1996 | Fischer et al. ........................ 252/174 |
| 5,518,809 | * | 5/1996 | Henry et al. ......................... 428/327 |

FOREIGN PATENT DOCUMENTS

| | | | |
|---|---|---|---|
| 2195918 | | 2/1996 | (CA) . |
| 2195918 | * | 1/1997 | (CA) ............................ C09D/183/06 |

* cited by examiner

Primary Examiner—David W. Wu
Assistant Examiner—K. C. Egwin
(74) Attorney, Agent, or Firm—Ronald D. Bakule

(57) ABSTRACT

An aqueous coating composition having improved block resistance which includes an emulsion polymer, a nonionic or anionic surfactant, the surfactant having an HLB value less than 11.6 or greater than 14.6, and an alkyl polyglycoside is provided. In addition a method for for improving the block resistance of a dried aqueous coating composition including forming the aqueous coating composition having improved block resistance, applying the aqueous coating composition to a substrate, and drying, or allowing to dry, the aqueous coating composition is provided.

4 Claims, No Drawings

AQUEOUS COATING COMPOSITION WITH IMPROVED BLOCK RESISTANCE CONTAINING ALKYL POLYGLYCOSIDE SURFACTANT MIXTURES

This invention relates to an aqueous coating composition having improved block resistance. More particularly, this invention relates to an aqueous coating composition including an emulsion polymer, a nonionic or anionic surfactant, the surfactant having an HLB value less than 11.6 or greater than 14.6, and an alkyl polyglycoside. And the invention relates to a method for improving the block resistance of a dried aqueous coating composition by forming an aqueous coating composition including an emulsion polymer, a nonionic or anionic surfactant, the surfactant having an HLB value less than 11.6 or greater than 14.6, and an alkyl polyglycoside; applying the aqueous coating composition to a substrate; and drying, or allowing to dry, the aqueous coating composition.

The present invention serves to provide a dried, or partially dried, coating which has improved resistance to blocking, i.e., resistance to adhering or sticking to a like-coated surface, when partially or fully dried. Coatings frequently come in contact with like coatings in painted window frames or door jambs where it is desired that the coatings do not fuse together even under adverse conditions of elevated temperature, pressure, or humidity even to the extent of resisting separation or marring the surfaces of one or both coatings on separation.

U.S. Pat. No. 4,657,999 discloses the use of alkyl polyglycosides of C8–C22 alkanols and reducing sugars, in which one sugar chain containing on average from 1 to 10 sugar residues attached to one another by glycoside bonds is present for every alkyl group, as sole emulsifiers or as co-emulsifiers with other surfactants in the emulsion polymerization of ethylenically unsaturated monomers. The use of these emulsion polymers in coatings was not disclosed nor is there any recognition of the criticality of the HLB value of the co-surfactant on the block resistance of a dried coating derived therefrom.

U.S. Pat. No. 5,340,394 discloses a aqueous dispersed pigmented tinting concentrate useful for tinting aqueous latex paints which contains at least about 2% by weight non-ionic alkyl polyglycoside surfactant based on the total weight of pigment in the tinting composition, a polyethylene glycol polyether vehicle having a number average molecular weight between about 200 and 700, and, optionally, other cosurfactants such as nonionic surfactants or amphoteric surfactants. There is no recognition of the criticality of the HLB value of the cosurfactant on the block resistance of a dried coating derived therefrom.

The problem faced by the inventors is the provision of a suitable composition and a method for improving the block resistance of a coating so that surfaces bearing the composition would exhibit a lessened tendency to block than a surface containing the same emulsion polymer absent the alkylpolyglycoside and the selected surfactant components of the composition of this invention. We have now found that that certain surfactants having an HLB range outside that reported for the alkyl polyglycosides when used in conjunction with alkylpolyglycosides are benefical to improved block resistance In a first aspect of the present invention there is provided an aqueous coating composition having improved block resistance including an emulsion polymer, a nonionic or anionic surfactant, the surfactant having an HLB value less than 11.6 or greater than 14.6, and an alkyl polyglycoside.

In a second aspect of the present invention there is provided a method for improving the block resistance of a dried aqueous coating composition by forming an aqueous coating composition including an emulsion polymer, a nonionic or anionic surfactant, the surfactant having an HLB value less than 11.6 or greater than 14.6, and an alkyl polyglycoside; applying the aqueous coating composition to a substrate; and drying, or allowing to dry, the aqueous coating composition.

The aqueous coating composition contains a waterborne emulsion polymer. The emulsion polymer contains at least one copolymerized ethylenically-unsaturated monomer, such as, for example, a (meth)acrylic ester monomer including methyl acrylate, ethyl acrylate, butyl acrylate, 2-ethylhexyl acrylate, decyl acrylate, methyl methacrylate, butyl methacrylate, hydroxyethyl methacrylate, hydroxypropyl methacrylate, aminoalkyl (meth)acrylate; styrene or substituted styrenes; butadiene; vinyl acetate or other vinyl esters; vinyl monomers such as vinyl chloride, vinylidene chloride, N-vinyl pyrollidone; (meth)acrylonitrile and (meth)acrylamide. The use of the term "(meth)" followed by another term such as acrylate or acrylamide, as used throughout the disclosure, refers to both acrylates and acrylamides and methacrylates and methacrylamides, respectively.

The emulsion polymer may also contain from 0% to 15%, preferably from 1% to 5%, of a copolymerized monoethylenically-unsaturated acid monomer, based on the dry weight of the polymer, such as, for example, acrylic acid, methacrylic acid, crotonic acid, itaconic acid, sulfoethyl methacrylate, phosphoroethyl methacrylate, fumaric acid, maleic acid, monomethyl itaconate, monomethyl fumarate, monobutyl fumarate, and maleic anhydride.

The emulsion polymer used in this invention is substantially thermoplastic, or substantially uncrosslinked, when it is applied to the substrate, although low levels of deliberate or adventitious crosslinking may be present. When low levels of precrosslinking or gel content are desired low levels of multi-ethylenically unsaturated monomers such as, for example, 0.1%–5%, by weight based on the weight of the emulsion-polymerized polymer, allyl methacrylate, diallyl phthalate, 1,3-butylene glycol dimethacrylate, 1,6-hexanedioldiacrylate, and divinyl benzene may be used. It is important, however, that the quality of the film formation is not materially impaired. Chain transfer agents such as, for example, alkyl mercaptans may be used in order to moderate the molecular weight of the polymer.

The polymerization techniques used to prepare emulsion polymers are well known in the art. In the preparation of emulsion polymers conventional surfactants may be used such as, for example, anionic and/or nonionic emulsifiers such as alkali or ammonium alkyl sulfates, alkyl sulfonic acids, fatty acids, and oxyethylated alkyl phenols. The amount of surfactant used is usually up to 6% by weight, based on the weight of total monomer. Either thermal or redox initiation processes may be used. Conventional free radical initiators may be used such as, for example, hydrogen peroxide, t-butyl hydroperoxide, and ammonium and/or alkali persulfates, typically at a level of 0.05% to 3.0% by weight, based on the weight of total monomer. Redox systems using the same initiators coupled with a suitable reductant such as, for example, sodium bisulfite may be used at similar levels.

In another aspect of the present invention the emulsion polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactant, chain transfer agents, etc. as disclosed herein-above for the emulsion polymer. The polymerization techniques used to prepare such multistage emulsion polymers are well known in the art such as, for example, U.S. Pat. Nos. 4,325,856; 4,654,397; and 4,814,373.

The emulsion polymer typically has an average particle diameter of 30 nanometers to 500 nanometers. Processes yielding polymodal particle size distributions such as those disclosed in U.S. Pat. Nos. 4,384,056 and 4,539,361, for example, may also be employed.

The glass transition temperature ("Tg") of the emulsion polymer is preferably from −10° C. to 70° C., as measured by differential scanning calorimetry (DSC) using the midpoint in the heat flow versus temperature transition as the Tg value.

The aqueous coating composition contains a nonionic or anionic surfactant, the surfactant having an HLB value less than 11.6 or greater than 14.6. HLB (hydrophilic/lipophilic balance) is a value characterizing the relative proportions of hydrophilic and lipophilic (i.e., hydrophobic) portions of molecules, such as the selected surfactants of the present invention. Higher HLB values (those approaching 40) represent relatively highly hydrophilic molecules and lower HLB values (those around 6 to 10) represent relatively more hydrophobic molecules. HLB values may be calculated or determined experimentally by a variety of known procedures, such as those described in "Surfactants and Interfacial Phenomena" by Milton J. Rosen, John Wiley and Son, New York, N.Y., page 242–244 (1978) and "Interfacial Phenomena" by J. T. Davies and E. K. Rideal, Academic Press, 2nd Edition, pp 373–383 (1963). The HLB values used herein were obtained from the supplier of the surfactant. If an HLB value is not supplied by the manufacturer, the 1949 calculation method by Griffin disclosed in "Surfactants and Interfacial Phenomena" may be used. Anionic surfactants which contain the salts of strong acids such as, for example, sulfates and phosphates, contain therefore a very hydrophilic group and have a high HLB value; HLB for such surfactants not published by the supplier has been assigned a value of 20 herein. Preferred is a composition containing 0.1% to 10% surfactant, by wt. based on polymer weight. More preferred is a composition containing 0.5% to 3% surfactant, by wt. based on polymer weight.

The aqueous coating composition contains an alkyl polyglycoside by which is meant herein an alkyl polyglycoside of $C_1$–$C_{18}$ alcohols and reducing sugars, in which one sugar chain containing on average from 1 to 10 sugar residues attached to one another by glycoside bonds is present for every alkyl group. The alkyl polyglycosides may be prepared by the process disclosed in U.S. Pat. No. 3,839,318 beginning with glucose or oligosaccharides and $C_8$–$C_{18}$ alcohols which may be reacted at 80–130° C. in the presence of an acidic catalyst such as, for example, sulfuric acid. The alkyl polyglycosides are surfactants having HLB values from 11.6 to 14.6 and may be used as sole or co-surfactants in the preparation of the emulsion polymer or post-added during or after the formation of the emulsion polymer. Preferred alkylpolyglycosides are GLUCOPON™ 225 (GLUCOPON™ is a trademark of Henkel Corporation) with an average alkyl chain length reported to be 9.1 and GLUCOPON™ 625 with an average alkyl chain length reported to be 12.8. Preferred is a composition containing 0.1% to 10% alkyl polyglycoside, by wt. based on polymer weight. More preferred is a composition containing 1% to 7% alkyl polyglycoside, by wt. based on polymer weight.

The amount of pigment in the aqueous coating composition may vary from a pigment volume concentration (PVC) of 0 to 75 and thereby encompass coatings otherwise described, for example, as clear coatings, semi-gloss or gloss coatings, flat coatings, and primers.

The aqueous coating composition is prepared by techniques which are well known in the coatings art. First, if the coating composition is to be pigmented, at least one pigment is well dispersed in an aqueous medium under high shear such as is afforded by a COWLES® mixer or, in the alternative, at least one predispersed pigment may be used. Then the emulsion polymer, selected surfactant and alkyl polyglycoside is added under low shear stirring along with other coatings adjuvants as desired. Alternatively, either or both of the selected surfactant and alkyl polyglycoside may have been previously added to the emulsion polymer before, during, or subsequent to the preparation of the emulsion polymer. Alternatively, the emulsion polymer may be present during the pigment dispersion step. The aqueous coating composition may contain conventional coatings adjuvants such as, for example, emulsifiers, buffers, neutralizers, coalescents, thickeners or rheology modifiers, freeze-thaw additives, wet-edge aids, humectants, wetting agents, biocides, antifoaming agents, colorants, waxes, and anti-oxidants.

The solids content of the aqueous coating composition may be from 25% to 60% by volume. The viscosity of the aqueous polymeric composition may be from 50 KU (Krebs Units) to 120 KU as measured using a Brookfield Digital viscometer KU-1; the viscosities appropriate for different application methods vary considerably.

Conventional coatings application methods such as, for example, brushing, rolling, and spraying methods such as, for example, air-atomized spray, air-assisted spray, airless spray, high volume low pressure spray, and air-assisted airless spray may be used. The aqueous coating composition may be applied to substrates such as, for example, wood, metal, plastics, cementitious substrates such as, for example, concrete, stucco, and mortar, previously painted or primed surfaces, and weathered surfaces. Drying is typically allowed to proceed under ambient conditions such as, for example, at 0° C. to 35° C.

The following examples are presented to illustrate the invention and the results obtained by the test procedures.

EXAMPLE 1

Preparation of Emulsion Polymers

Sample 1. To a 5-liter 4-neck round bottom flask equipped with a paddle stirrer, heating mantle and temperature controller, condenser and a nitrogen atmosphere was charged 1200 g of water and 2 g of sodium lauryl sulfate. Ingredients were heated to 85° C. A monomer emulsion of 700 g water, 20 g sodium lauryl sulfate, 920 g butyl acrylate, 1040 g methyl methacrylate, 40 g methacrylic acid, was prepared. Next, a solution of 3 g sodium carbonate and 20 g water, 25 g charge from the monomer emulsion, and a solution of 6 g ammonium persulfate and 20 g water was added to the flask. The ingredients were stirred for 10 minutes at 85° C. The remaining monomer emulsion and a solution of 1 g ammonium persulfate and 10 g water were added continuously over 180 minutes. At the end of the feed 216.2 g Glucopon® 625 (37% active ingredient in water) was added over 20 minutes and stirred for an additional 20 minutes. The entire mixture was cooled to 60° C. and 5 g (0.15% by wt.) of a ferrous sulfate heptahydrate, 1 g t-butyl hydroperoxide and 10 g water, and 0.5 g sodium sulfoxylate in 20 g water was added to the mixture and stirred for 30 minutes. While cooling, 11 g of ammonium hydroxide (28% by wt.) was added. The batch was cooled and filtered. Sample 2 was prepared according to the method of Sample 1 above with the exception that no Glucopon® 625 was added.

EXAMPLE 2

Preparation of Coating Bases

Coating Base 1 (CB-1) was prepared according to Table 2-1 and Coating Base 2 (CC-2) according to Table 2-2.

TABLE 2-1

Coating Base CB-1

| MATERIAL | Grams |
|---|---|
| GRIND | |
| Methyl Carbitol | 6.3 |
| Tego FOAMEX ® 800 | 1.0 |
| Propylene Glycol | 33.8 |
| TAMOL ® 731 (25%) | 8.2 |
| TiPure ® R700 | 205.4 |
| Grind the above 15–20 min then add at lower speed | |
| Water | 20.0 |
| LETDOWN | |
| Emulsion Polymer - Sample 1 | 566.5 |
| Methyl Carbitol | 5.0 |
| TEXANOL ® | 32.3 |
| ACRYSOL ® RM-2020 | 90.0 |
| Water | 58.5 |
| PVC | 17.9 |
| Volume Solids | 34.4% |
| GRIND | |
| Methyl Carbitol | 6.3 |
| Tego FOAMEX ® 800 | 1.0 |
| Propylene Glycol | 33.8 |
| TAMOL ® 731 (25%) | 8.2 |
| TiPure ® R700 | 205.4 |
| Grind the above 15–20 min then add at lower speed | |
| Water | 20.0 |
| LETDOWN | |
| Emulsion Polymer - Sample 2 | 552.4 |
| Methyl Carbitol | 5.0 |
| TEXANOL ® | 32.0 |
| ACRYSOL ® RM-2020 | 90.0 |
| Water | 71.6 |
| PVC | 17.9 |
| Volume Solids | 34.4% |

Notes: TiPure ® is a trademark of EI DuPont de Nemours Co. TEXANOL ® is a trademark of Eastman Chemical Co. FOAMEX ® is a trademark of Tego Chemie Service USA, a Division of Goldschmidt Chemical Corporation. TAMOL ® and ACRYSOL ® are trademarks of Rohm and Haas Co.

EXAMPLE 3

Evaluation of Coating Compositions

To a sample of Coating Base was added surfactant, if any, with stirring to provide the Coating Compositions identified in Tables 3-1.

In order to determine block resistance, the coating composition was cast on a Leneta WB test chart ("panel") (from The Leneta Company, Mahwah, N.J.) using a 3 mil Bird applicator. Coated panels were held in the constant temperature room ("CTR") (25° C.; 50% RH) for one day or seven days. Four 3.8 cm×3.8 cm (1½ in×1½ in) sections (to run duplicates) were cut from the white area of each conditioned panel. The cut sections were placed with the coated surfaces face to face. The face to face specimen was placed on the bench top in the CTR("Room Temp Block"). Each individual specimen was topped with a solid, number 8 rubber stopper and a 1000 g. weight was positioned on each stopper. After 16 hours, the stoppers and weights were removed. The specimens were separated with slow and steady force at an angle of approximately 180° while listening for tack, i.e., the noise produced upon separation of blocked surfaces.

Alternatively, for the "Oven Block" test the changes to the procedure above were that the face to face specimen was placed in a 50° C. (120° F.) oven on a flat metal plate. Each individual specimen was topped with a heated, solid, number 8 rubber stopper and a heated 1000 g. weight was positioned on each stopper. After exactly 30 minutes, the stoppers and weights were removed and the test specimens were removed from the oven. The test specimens were allowed to cool for 30 minutes at room temperature before separating as above.

The samples were rated for block resistance on a scale of 0 to 10, which corresponded to a subjective tack and seal rating (seal is the physical damage to a coating surface caused by the separation of blocked surfaces) as is delineated below in descriptive terms.

10, no tack, perfect
9, trace tack, excellent
8, slight tack, very good
7, slight tack, good
6, moderate tack, good
5, moderate tack, fair
4, severe tack, no seal, fair
3, 5–25% seal, poor
2, 25–50% seal, poor
1, 50–75% seal, poor
0, complete seal, very poor Block resistance differences of ±1 unit are regarded as significant.

TABLE 3-1

Block Resistance of Coating Compositions

| | | | Oven Block 7 Day Dry | | Room Temp Block 1 Day Dry | |
|---|---|---|---|---|---|---|
| Surfactant Added | HLB | Surf. Level kg/l | Coating Base CB-2 | Coating Base CB-1 | Coating Base CB-2 | Coating Base CB-1 |
| none | — | — | 0 | 0 | 0 | 5 |
| TRITON ® GR-7M | 20 | 0.24 | 0 | 5 | 0 | 7 |
| TRITON ® H-66 | 20 | 0.24 | 0 | 6 | 0 | 7 |
| TRITON ® CF-10 | 14.0 | 0.24 | 0 | 2 | 0 | 5 |
| TRITON ® X-15 | 3.6 | 0.24 | 0 | 0 | 0 | 5 |
| TRITON ® X-45 | 10.4 | 0.24 | 0 | 3 | 0 | 5 |
| TRITON ® X-102 | 14.6 | 0.24 | 0 | 0 | 0 | 5 |
| TRITON ® X-405 | 17.9 | 0.24 | 0 | 8 | 0 | 5 |
| TRITON ® N-17 | 4.6 | 0.24 | 0 | 0 | 0 | 5 |
| TRITON ® N-57 | 10.0 | 0.24 | 0 | 6 | 0 | 5 |
| TRITON ® N-128 | 14.4 | 0.24 | 0 | 0 | 0 | 2 |
| TRITON ® N-401 | 17.8 | 0.24 | 0 | 2 | 0 | 6 |
| none | — | — | 0 | 0 | 0 | 4 |
| Igepal ® CO-630 | 13.0 | 0.24 | 0 | 0 | 0 | 4 |

TABLE 3-1-continued

Block Resistance of Coating Compositions

| Surfactant Added | HLB | Surf. Level kg/l | Oven Block 7 Day Dry | | Room Temp Block 1 Day Dry | |
|---|---|---|---|---|---|---|
| | | | Coating Base CB-2 | Coating Base CB-1 | Coating Base CB-2 | Coating Base CB-1 |
| Tergitol ® NP-9 | 12.9 | 0.24 | 0 | 0 | 0 | 2 |
| Tergitol ® NP-10 | 13.6 | 0.24 | 0 | 0 | 0 | 2 |
| TRITON ® N-101 | 13.4 | 0.24 | 0 | 0 | 0 | 0 |
| TRITON ® GR-7M | 20 | 0.48 | 0 | 6 | 0 | 6 |
| TRITON ® H-66 | 20 | 0.48 | 0 | 0 | 0 | 5 |
| TRITON ® CF-10 | 14.0 | 0.48 | 0 | 5 | 0 | 5 |
| TRITON ® X-15 | 3.6 | 0.48 | 0 | 5 | 0 | 5 |
| TRITON ® X-45 | 10.4 | 0.48 | 0 | 5 | 0 | 5 |
| TRITON ® X-102 | 14.6 | 0.48 | 0 | 0 | 0 | 2 |
| TRITON ® X-405 | 17.9 | 0.48 | 0 | 6 | 0 | 6 |
| TRITON ® N-17 | 4.6 | 0.48 | 0 | 3 | 0 | 5 |
| TRITON ® N-57 | 10.0 | 0.48 | 0 | 2 | 0 | 5 |
| TRITON ® N-128 | 14.4 | 0.48 | 0 | 0 | 0 | 5 |
| TRITON ® N-401 | 17.8 | 0.48 | 0 | 6 | 0 | 6 |
| none | — | 0.48 | 0 | 0 | 0 | 4 |
| Igepal ® CO-630 | 13.0 | 0.48 | 0 | 0 | 0 | 0 |
| Tergitol ® NP-9 | 12.9 | 0.48 | 0 | 0 | 0 | 0 |
| Tergitol ® NP-10 | 13.6 | 0.48 | 0 | 0 | 0 | 0 |
| TRITON ® N-101 | 13.4 | 0.48 | 0 | 0 | 0 | 0 |

Notes: TRITON ® and TERGITOL ® are trademarks of Union Carbide Chemical & Plastics co.; IGEPAL ® is a trademark of Rhone-Poulenc Surfactants and Specialties.

Examples of the invention containing an alkyl polyglycoside (Coating Base 1) and an anionic or nonionic surfactant, the surfactant having an HLB value less than 11.6 or greater than 14.6 exhibit block resistance superior to comparative examples absent alkyl polyglucoside (Coating Base 2) and/or containing anionic or nonionic surfactant having an HLB value from 11.6 to 14.6, particularly at higher surfactant levels or under the more extreme oven block test conditions.

What is claimed is:

1. A method for improving the block resistance of a dried aqueous coating composition comprising forming an aqueous coating composition comprising an emulsion polymer, a nonionic or anionic surfactant, said surfactant having an HLB value less than 11.6 or greater than 14.6, and an alkyl polyglycoside;

applying said aqueous coating composition to a substrate; and drying, or allowing to dry, said aqueous coating composition.

2. The method of claim 1 wherein said polymer has a glass transition temperature from −10° C. to 70° C.

3. The method of claim 1 wherein the amount of said surfactant is from 0.1 to 10%, by weight based on dry polymer weight.

4. A. The method of claim 1 wherein the amount of said alkyl polyglycoside is from 0.1 to 10%, by weight based on dry polymer weight.

* * * * *